US009745451B2

(12) United States Patent
Zhao et al.

(10) Patent No.: US 9,745,451 B2
(45) Date of Patent: Aug. 29, 2017

(54) SWELLABLE COMPOSITIONS, ARTICLES FORMED THEREFROM, AND METHODS OF MANUFACTURE THEREOF

(71) Applicants: Lei Zhao, Houston, TX (US); Zhiyue Xu, Cypress, TX (US); James Edward Goodson, Porter, TX (US); Wayne R. Furlan, Cypress, TX (US)

(72) Inventors: Lei Zhao, Houston, TX (US); Zhiyue Xu, Cypress, TX (US); James Edward Goodson, Porter, TX (US); Wayne R. Furlan, Cypress, TX (US)

(73) Assignee: Baker Hughes Incorporated, Houston, TX (US)

( * ) Notice: Subject to any disclaimer, the term of this patent is extended or adjusted under 35 U.S.C. 154(b) by 60 days.

(21) Appl. No.: 14/542,695

(22) Filed: Nov. 17, 2014

(65) Prior Publication Data
US 2016/0138359 A1    May 19, 2016

(51) Int. Cl.
E21B 33/127 (2006.01)
C08K 7/24 (2006.01)
F16J 15/02 (2006.01)
E21B 33/12 (2006.01)
F16J 15/06 (2006.01)

(52) U.S. Cl.
CPC ............ C08K 7/24 (2013.01); E21B 33/1208 (2013.01); F16J 15/02 (2013.01); F16J 15/068 (2013.01)

(58) Field of Classification Search
CPC ........ E21B 33/127; F16J 15/02; F16J 15/068; C08K 7/24

USPC ......................................................... 277/331
See application file for complete search history.

(56) References Cited

U.S. PATENT DOCUMENTS

| 3,904,405 A | 9/1975 | Russell et al. |
| 3,981,427 A | 9/1976 | Brookes |
| 4,116,451 A | 9/1978 | Nixon et al. |
| 4,205,858 A | 6/1980 | Shimazaki et al. |
| 4,234,638 A | 11/1980 | Yamazoe et al. |
| 4,372,393 A | 2/1983 | Baker |

(Continued)

FOREIGN PATENT DOCUMENTS

| CA | 2429780 A1 | 12/2003 |
| CN | 102775669 | 11/2012 |

(Continued)

OTHER PUBLICATIONS

PCT International Search Report and Written Opinion; International Application No. PCT/US2015/054920; International Filing Date: Oct. 9, 2015; Date of Mailing: May 18, 2016; 12 pages.

(Continued)

Primary Examiner — Gilbert Lee
(74) Attorney, Agent, or Firm — Cantor Colburn LLP

(57) ABSTRACT

A swellable composition comprises: a matrix material; and a condensed expandable graphite material disposed in the matrix material. A seal arrangement comprises: a swellable member and a sealing member disposed on a surface of the swellable member; wherein the swellable member comprises a condensed expandable graphite material. The condensed expandable graphite material in the swellable composition and the swellable member has a bulk density of about 1 to about 8 g/cm$^3$ and comprises expandable graphite.

35 Claims, 3 Drawing Sheets

(56) References Cited

U.S. PATENT DOCUMENTS

| | | |
|---|---|---|
| 4,426,086 A | 1/1984 | Fournie et al. |
| 4,743,033 A | 5/1988 | Guess |
| 4,798,771 A | 1/1989 | Vogel |
| 4,799,956 A | 1/1989 | Vogel |
| 4,826,181 A | 5/1989 | Howard |
| 4,885,218 A | 12/1989 | Andou et al. |
| 5,117,913 A | 6/1992 | Thernig |
| 5,134,030 A | 7/1992 | Ueda et al. |
| 5,195,583 A * | 3/1993 | Toon .................. E21B 33/1243 166/179 |
| 5,201,532 A | 4/1993 | Salesky et al. |
| 5,225,379 A | 7/1993 | Howard |
| 5,228,701 A | 7/1993 | Greinke et al. |
| 5,247,005 A | 9/1993 | Von Bonin et al. |
| 5,257,603 A | 11/1993 | Bauer et al. |
| 5,283,121 A | 2/1994 | Bordner |
| 5,286,574 A | 2/1994 | Foster et al. |
| 5,362,074 A | 11/1994 | Gallo et al. |
| 5,392,982 A | 2/1995 | Li |
| 5,455,000 A | 10/1995 | Seyferth et al. |
| 5,467,814 A | 11/1995 | Hyman et al. |
| 5,494,753 A | 2/1996 | Anthony |
| 5,495,979 A | 3/1996 | Sastri et al. |
| 5,499,827 A | 3/1996 | Suggs et al. |
| 5,522,603 A | 6/1996 | Naitou et al. |
| 5,730,444 A | 3/1998 | Notter |
| 5,765,838 A | 6/1998 | Ueda et al. |
| 5,791,657 A | 8/1998 | Cain et al. |
| 5,992,857 A | 11/1999 | Ueda et al. |
| 6,020,276 A | 2/2000 | Hoyes et al. |
| 6,027,809 A | 2/2000 | Ueda et al. |
| 6,065,536 A | 5/2000 | Gudmestad et al. |
| 6,075,701 A | 6/2000 | Ali et al. |
| 6,105,596 A | 8/2000 | Hoyes et al. |
| 6,128,874 A | 10/2000 | Olson et al. |
| 6,131,651 A | 10/2000 | Richy, III |
| 6,152,453 A | 11/2000 | Kashima et al. |
| 6,161,838 A | 12/2000 | Balsells |
| 6,182,974 B1 | 2/2001 | Harrelson |
| 6,234,490 B1 | 5/2001 | Champlin |
| 6,258,457 B1 | 7/2001 | Ottinger et al. |
| 6,273,431 B1 | 8/2001 | Webb |
| 6,506,482 B1 | 1/2003 | Burton et al. |
| 6,581,682 B1 | 6/2003 | Parent et al. |
| 6,585,053 B2 | 7/2003 | Coon et al. |
| 6,789,634 B1 | 9/2004 | Denton |
| 6,880,639 B2 | 4/2005 | Rhodes et al. |
| 7,105,115 B2 | 9/2006 | Shin |
| 7,470,468 B2 | 12/2008 | Mercuri et al. |
| 7,666,469 B2 | 2/2010 | Weintritt et al. |
| 2001/0003389 A1 | 6/2001 | Pippert |
| 2002/0114952 A1 | 8/2002 | Ottinger et al. |
| 2002/0140180 A1 | 10/2002 | Waltenberg et al. |
| 2003/0137112 A1 | 7/2003 | Richter et al. |
| 2004/0026085 A1 | 2/2004 | Vacik et al. |
| 2004/0097360 A1 | 5/2004 | Benitsch et al. |
| 2004/0127621 A1 | 7/2004 | Drzal et al. |
| 2004/0155382 A1 | 8/2004 | Huang et al. |
| 2004/0186201 A1 | 9/2004 | Stoffer et al. |
| 2006/0042801 A1 * | 3/2006 | Hackworth ............. E21B 29/10 166/387 |
| 2006/0220320 A1 | 10/2006 | Potier et al. |
| 2006/0249917 A1 | 11/2006 | Kosty |
| 2006/0272321 A1 | 12/2006 | Mockenhaupt et al. |
| 2007/0009725 A1 | 1/2007 | Noguchi et al. |
| 2007/0054121 A1 | 3/2007 | Weintritt et al. |
| 2007/0142547 A1 | 6/2007 | Vaidya et al. |
| 2007/0257405 A1 * | 11/2007 | Freyer ................. E21B 33/1208 264/570 |
| 2008/0128067 A1 | 6/2008 | Sayir et al. |
| 2008/0175764 A1 * | 7/2008 | Sako .................... F01N 3/0211 422/177 |
| 2008/0289813 A1 | 11/2008 | Gewily et al. |
| 2009/0075120 A1 | 3/2009 | Cornie et al. |
| 2009/0151847 A1 | 6/2009 | Zhamu et al. |
| 2009/0302552 A1 | 12/2009 | Leinfelder et al. |
| 2010/0098956 A1 | 4/2010 | Sepeur et al. |
| 2010/0143690 A1 | 6/2010 | Romero et al. |
| 2010/0203340 A1 | 8/2010 | Ruoff et al. |
| 2010/0207055 A1 | 8/2010 | Ueno et al. |
| 2010/0266790 A1 | 10/2010 | Kusinski et al. |
| 2011/0045724 A1 | 2/2011 | Bahukudumbi |
| 2011/0098202 A1 | 4/2011 | James et al. |
| 2012/0107590 A1 | 5/2012 | Xu et al. |
| 2013/0001475 A1 | 1/2013 | Christ et al. |
| 2013/0192853 A1 | 8/2013 | Themig |
| 2013/0284737 A1 | 10/2013 | Ju et al. |
| 2013/0287326 A1 | 10/2013 | Porter et al. |
| 2013/0292138 A1 | 11/2013 | Givens et al. |
| 2014/0051612 A1 | 2/2014 | Mazyar et al. |
| 2014/0127526 A1 | 5/2014 | Etschmaier et al. |
| 2014/0224466 A1 | 8/2014 | Lin et al. |
| 2014/0272592 A1 | 9/2014 | Thompkins et al. |
| 2015/0034316 A1 * | 2/2015 | Hallundbæk ....... E21B 33/1208 166/285 |
| 2015/0068774 A1 * | 3/2015 | Hallundbæk ......... E21B 33/127 166/387 |
| 2015/0158773 A1 | 6/2015 | Zhao et al. |
| 2015/0267816 A1 | 9/2015 | Boskovski |
| 2016/0089648 A1 | 3/2016 | Xu et al. |
| 2016/0108703 A1 | 4/2016 | Xu et al. |
| 2016/0130519 A1 | 5/2016 | Zhao et al. |
| 2016/0136923 A1 | 5/2016 | Zhao et al. |
| 2016/0136928 A1 | 5/2016 | Zhao et al. |
| 2016/0145966 A1 | 5/2016 | Zhao et al. |
| 2016/0146350 A1 | 5/2016 | Zhao et al. |
| 2016/0160602 A1 | 6/2016 | Ruffo |
| 2016/0176764 A1 | 6/2016 | Xu et al. |
| 2016/0186031 A1 | 6/2016 | Zhao et al. |
| 2016/0333657 A1 | 11/2016 | Zhao et al. |

FOREIGN PATENT DOCUMENTS

| | | |
|---|---|---|
| EP | 0747615 B1 | 10/2001 |
| EP | 2056004 A1 | 5/2009 |
| EP | 2586963 A1 | 5/2013 |
| JP | 2014141746 | 8/2014 |
| WO | 9403743 | 2/1994 |
| WO | 03102360 | 12/2003 |
| WO | 2004015150 A2 | 2/2004 |
| WO | 2005115944 | 12/2005 |
| WO | 2007138409 A1 | 12/2007 |
| WO | 2008021033 A2 | 2/2008 |
| WO | 2011039531 A1 | 4/2011 |
| WO | 2014028149 A1 | 2/2014 |

OTHER PUBLICATIONS

Baxter et al., "Microstructure and solid particle erosion of carbon-based materials used for the protection of highly porous carbon-carbon composite thermal insulation", Journal of Materials Science, vol. 32, 1997, pp. 4485-4492.

Etter et al., "Aluminum carbide formation in interpenetrating graphite/aluminum composites", Materials Science and Engineering, Mar. 15, 2007, vol. 448, No. 1, pp. 1-6.

Hutsch et al., "Innovative Metal-Graphite Composites as Thermally Conducting Materials", PM2010 World Congress—PM Functional Materials—Heat Sinks, 2010, 8 pages.

International Search Report and Written Opinion; International Application No. PCT/US2014/065389; International Filing Date: Nov. 13, 2014; Date of Mailing: Mar. 18, 2015; 15 pages.

International Search Report and Written Opinion; International Application No. PCT/US2015/056196; International Filing Date: Oct. 19, 2015; Date of Mailing: Jan. 26, 2016; 13 pages.

Levin et al., "Solid Particle Erosion Resistance and High Strain Rate Deformation Behavior of Inconel-625 Alloy", Superalloys 718, 625, 706 and Various Derivatives, The Minerals, Metals & Materials Society, 1997, 10 pages.

Miyamoto et al., "Development of New Composites; Ceramic Bonded Carbon", Transactions of JWRI, vol. 38, No. 2, 2009, pp. 57-61.

(56) References Cited

OTHER PUBLICATIONS

Moghadam et al, "Functional Metal Matrix Composites: Self-lubricating, Self-healing, and Nanocomposites—An Outlook", The Minerals, Metals & Materials Society, Apr. 5, 2014, 10 pages.
Pohlmann et al., "Magnesium alloy-graphite composites with tailored heat conduction properties for hydrogen storage applications", International Journal of Hydrogen Energy, 35 (2010), pp. 12829-12836.
Tikhomirov et al., "The chemical vapor infiltration of exfoliated graphite to produce carbon/carbon composites", Carbon, 49 (2011), pp. 147-153.
Yang et al., "Effect of tungsten addition on thermal conductivity of graphite/copper composites", Composites Part B: Engineering, May 31, 2013, vol. 55, pp. 1-4.
International Search Report, International Application No. PCT/US2015/054924, Date of Mailing Jan. 28, 2016, Korean Intellectual Property Office; International Search Report 6 pages.
International Written Opinion, International Application No. PCT/US2015/054924, Date of Mailing Jan. 28, 2016, Korean Intellectual Property Office; Written Opinion 8 pages.
Rashad et al. "Effect of of Graphene Nanoplatelets addition on mechanical properties of pure aluminum using a semi-powder method", Materials International, Apr. 20, 2014, vol. 24, pp. 101-108.

\* cited by examiner

SWELLABLE COMPOSITIONS, ARTICLES FORMED THEREFROM, AND METHODS OF MANUFACTURE THEREOF

BACKGROUND

Fluid-swellable materials are capable of generating a contact force against a nearby structure when exposed to a fluid reactive with the swelling material. Fluid-swellable materials have been used in various industries. For example, in the downhole drilling and completions industry, fluid-swellable materials are used for a variety of packer, isolation, actuation, and sealing devices. Compared with mechanically setup packers and inflatable packers, fluid-swellable packers are easier to set up. However, in certain applications, the sealing rate of fluid-swellable packers may be less than desirable. In addition, some fluid-swellable packers may lose elastic modulus after swelling up. This loss in elastic modulus will typically undesirably increase the length of the packer in order to ensure adequate sealing. Thus, the industry is always receptive to new swellable materials or articles having improved reliability in long term service. It would be a further advantage if such materials or articles also have improved sealing rates.

BRIEF DESCRIPTION

The above and other deficiencies in the prior art are overcome by, in an embodiment, a swellable composition comprising: a matrix material; and a condensed expandable graphite material disposed in the matrix material; wherein the condensed expandable graphite material has a bulk density of about 1 to about 8 $g/cm^3$ and comprises expandable graphite. A method of making the composition comprises combining the condensed expandable graphite material with the matrix material.

An article comprising the swellable composition is also provided. A method of forming the article comprises shaping or machining the swellable composition.

A method of deploying an article comprises: positioning an article at a predetermined location; wherein the article comprises a composition that contains a matrix material and a condensed expandable graphite material, and wherein the composition has a first shape; and activating the condensed expandable graphite material to cause the composition to attain a second shape different from the first shape; wherein the condensed expandable graphite material has a bulk density of about 1 to about 8 $g/cm^3$ and wherein the condensed expandable graphite material comprises expandable graphite.

In another embodiment, a seal arrangement comprises a swellable member and a sealing member disposed on a surface of the swellable member; wherein the swellable member comprises a condensed expandable graphite material; and wherein condensed expandable graphite material has a bulk density of about 1 to about 8 $g/cm^3$ and comprises expandable graphite.

A method of deploying a seal arrangement comprises positioning the seal arrangement at a predetermined location; the swellable member having a first shape; and activating the swellable member to cause the swellable member to attain a second shape different from the first shape.

BRIEF DESCRIPTION OF THE DRAWINGS

The following descriptions should not be considered limiting in any way. With reference to the accompanying drawings, like elements are numbered alike:

FIG. 3 illustrates a swelling mechanism according to an embodiment of the disclosure wherein FIG. 3(a) shows a composition before swelling and FIG. 3(b) shows a composition after swelling; FIG. 4(a) shows a packer before the setup and FIG. 4(b) shows the packer after the setup.

DETAILED DESCRIPTION

Graphites are made up of layers of hexagonal arrays or networks of carbon atoms. Because no covalent bonding exists between the carbon layers, other molecules that are commonly referred to as "intercallant" can be inserted between them. Upon activation, the intercallant can be converted from a liquid or solid state to a gas phase. Gas formation generates pressure which pushes adjacent carbon layers apart thus expanding the graphite.

Graphite having intercallant materials inserted between carbon layers is commonly referred to as expandable graphite. Expandable graphite is commercially available as flakes. Although expandable graphite can expand hundreds of times in volume, expandable graphite flakes can hardly be used directly in enlarging elastic materials in applications where a higher degree of swelling is needed. Surprisingly, Applicants have found that the condensed expandable graphite materials disclosed herein are effective to generate sufficient forces upon activation to cause a matrix material to swell significantly. Without wishing to be bound by theory, it is believed that expandable flakes may have limited expansion forces because the gas generated from the intercallant may leak at the edges of the flakes along the basal planes of the expandable graphite. Further without being bound by theory, it is believed that in the condensed expandable graphite material, gas generated by the intercallant can be trapped inside limited spaces thus generating stronger swelling forces. The discovery allows the manufacture of swellable articles that have a high sealing rate as well as improved reliability. Compared to metal to metal seals, the swellable article is easier to set up.

Figure 1:
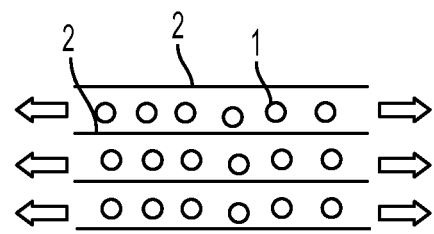
FIG. 1 is a schematic illustration of a gas leakage process a single expandable graphite flake.
Figure 2:
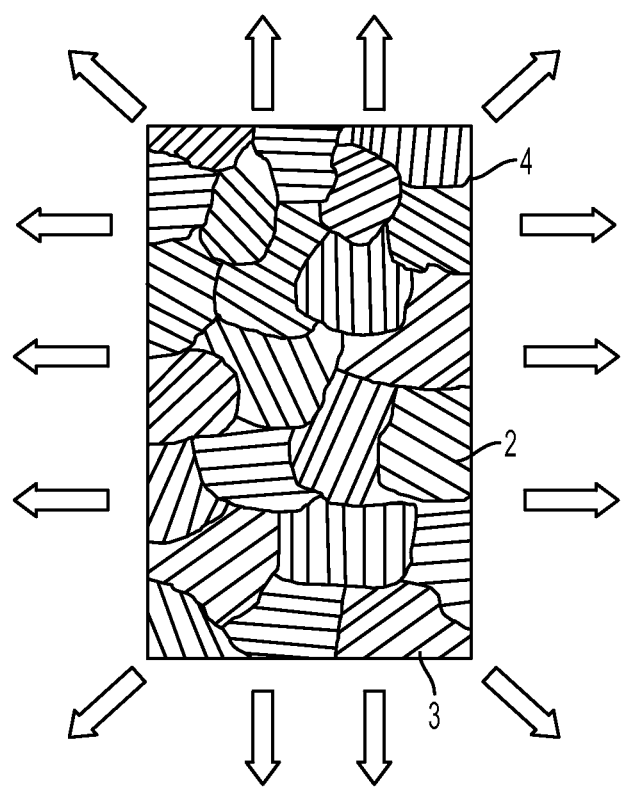
FIG. 2 is a schematic illustration of a gas leakage process in a condensed expandable graphite particle.

A schematic illustration of gas leakage processes in a single expandable graphite flake and in a condensed expandable graphite particle is illustrated in FIGS. 1 and 2 respectively. As shown in FIG. 1, gas generated from intercallant 1 may be lost along the basal planes 2 at the edges of the expandable graphite flake. As shown in FIG. 2, a condensed expandable graphite particle contains multiple graphite grains 3. The grain boundary is shown as 4. In the condensed expandable graphite particle, the concentration of the intercallant is increased. Further, as shown in FIG. 2, graphite grains are confined in a particle of condensed graphite. Accordingly, there is no gas leakage at the boundaries of graphite grains, thus more gas pressure can be generated.

Figure 3:
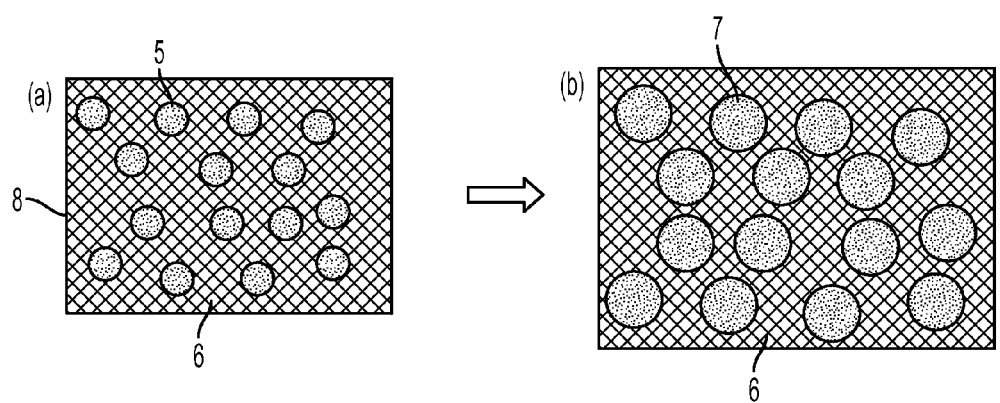

An exemplary swelling mechanism is illustrated in FIG. 3. As shown in FIG. 3, composition 8 contains condensed expandable graphite 5 and a matrix material 6. When the expandable graphite is activated, expandable graphite 5 expands and forms expanded graphite 7. Meanwhile, the expansion of expandable graphite 5 causes the composition containing the matrix material and the graphite to swell.

The matrix material can be an elastic material. In an embodiment, the matrix material is one or more of the following: an ethylene-propylene-diene monomer rubber; a butadiene rubber; a styrene-butadiene rubber; a natural rubber; an acrylonitrile butadiene rubber; a styrene-butadiene-acrylonitrile resin; a butadiene-nitrile rubber; a polyisoprene rubber; an acrylate-butadiene rubber; a polychloroprene rubber; an acrylate-isoprene rubber; an ethylene-vinyl acetate rubber; a polypropylene oxide rubber; a polypropylene sulfide rubber; a fluoroelastomer, or a thermoplastic polyurethane rubber. Fluoroelastomers are specifically mentioned. Exemplary fluoroelastomers include high fluorine content fluoroelastomers rubbers such as those in the FKM family and marketed under the tradename VITON® (available from FKM-Industries) and perfluoroelastomers such as FFKM (also available from FKM-Industries) and marketed under the tradename KALREZ® perfluoroelastomers (available from DuPont).

The condensed expandable graphite disposed in the matrix material has a bulk density of about 1 to about 8 g/cm$^3$, about 1 to about 6 g/cm$^3$, about 1 to about 5 g/cm$^3$, or about 1 to about 3 g/cm$^3$. When the condensed expandable graphite is in the form of a powder, a bulk density of the condensed expandable graphite refers to the density of the bulk material (a solid piece before milling) used to make the condensed expandable graphite. The powder of the condensed expandable graphite can have a tapped density of about 0.1 to about 6 g/cm$^3$, about 0.1 to about 4 g/cm$^3$, or about 0.1 to about 3 g/cm$^3$ or about 0.1 to about 2 g/cm$^3$. When a binder is present, the powder of the condensed expandable graphite material can have a tapped density of about 1 to about 5 g/cm$^3$. As used herein, a tapped density refers to a density attained after mechanically tapping a graduated cylinder or vessel containing the sample until little (<5%) or no further volume change is observed.

The condensed expandable graphite can have any desired shape. The sizes or the dimensions of the condensed expandable graphite are not particularly limited. Illustratively, condensed expandable graphite material comprises particles having an average particle size of about 10 microns to about 5 centimeters, about 10 μm to about 1 cm, or about 1 cm to about 5 cm. Particle size can be determined by an appropriate method of sizing particles such as, for example, static or dynamic light scattering (SLS or DLS) using a laser light source.

The condensed expandable graphite material comprises expandable graphite. As used herein, expandable graphite refers to graphite having intercallant materials inserted between carbon layers of graphite. A wide variety of chemicals have been used to intercalate graphite materials. These include acids, oxidants, halides, or the like. Exemplary intercallant materials include sulfuric acid, nitric acid, chromic acid, boric acid, SO$_3$, or halides such as FeCl$_3$, ZnCl$_2$, and SbCl$_5$. Other intercallant materials known in the art can also be used.

Optionally, the condensed expandable graphite material further contains a binder. Exemplary binders include one or more of the following: SiO$_2$; Si; B; B$_2$O$_3$; a metal; or a metal alloy. The metal can be aluminum, copper, titanium, nickel, tungsten, chromium, iron, manganese, zirconium, hafnium, vanadium, niobium, molybdenum, tin, bismuth, antimony, lead, cadmium, or selenium. The alloy includes aluminum alloys, copper alloys, titanium alloys, nickel alloys, tungsten alloys, chromium alloys, iron alloys, manganese alloys, zirconium alloys, hafnium alloys, vanadium alloys, niobium alloys, molybdenum alloys, tin alloys, bismuth alloys, antimony alloys, lead alloys, cadmium alloys, or selenium alloys. In an embodiment, the binder comprises copper, nickel, chromium, iron, titanium, an alloy of copper, an alloy of nickel, an alloy of chromium, an alloy of iron, an alloy of titanium, or a combination comprising at least one of the foregoing metal or metal alloy. Exemplary alloys include steel, nickel-chromium based alloys such as Inconel*, and nickel-copper based alloys such as Monel alloys. Nickel-chromium based alloys can contain about 40-75% of Ni and about 10-35% of Cr. The nickel-chromium based alloys can also contain about 1 to about 15% of iron. Small amounts of Mo, Nb, Co, Mn, Cu, Al, Ti, Si, C, S, P, B, or a combination comprising at least one of the foregoing can also be included in the nickel-chromium based alloys. Nickel-copper based alloys are primarily composed of nickel (up to about 67%) and copper. The nickel-copper based alloys can also contain small amounts one or more of the following: iron, manganese, carbon, or silicon. These materials can be in different shapes, such as particles, fibers, and wires. Combinations of the materials can be used.

The binder can be micro- or nano-sized. In an embodiment, the binder has an average particle size of about 0.05 to about 250 microns, about 0.05 to about 100 microns, about 0.05 to about 50 microns, about 0.05 to about 10 microns, specifically, about 0.5 to about 5 microns, and more specifically about 0.1 to about 3 microns. Without wishing to be bound by theory, it is believed that when the binder has a size within these ranges, it disperses uniformly among the expandable graphite.

The expandable graphite is present in an amount of about 20 wt. % to about 100 wt. %, about 20 wt. % to about 95 wt. %, about 20 wt. % to about 80 wt. %, or about 50 wt. % to about 80 wt. %, based on the total weight of the composition. The binder is present in an amount of 0 wt. % to about 75 wt. %, about 5 wt. % to about 75 wt. % or about 20 wt. % to about 50 wt. %, based on the total weight of the composition. Advantageously, the binder melts or softens when the intercallant material is activated and binds expandable graphite together upon cooling to further improve the structural integrity of the resulting article/composition. The binding mechanism includes mechanical interlocking, chemical bonding, or a combination thereof.

The swellable composition can further comprise a filler such as carbon, carbon black, mica, clay, glass fiber, or ceramic materials. Exemplary carbon includes amorphous carbon, natural graphite, and carbon fiber. Exemplary ceramic materials include SiC, Si$_3$N$_4$, SiO$_2$, BN, and the like. These materials can be in different shapes, such as particles, fibers, and wires. Combinations of the materials can be used. The filler can be present in an amount of about 0.5 to about 10 wt. % or about 1 to about 8%, based on the total weight of the composition.

Optionally the swellable composition includes an activation material comprising one or more of the following: a thermite; or a self-propagating powder mixture. Thermite compositions include, for example, a metal powder (a reducing agent) and a metal oxide (an oxidizing agent) that produces an exothermic oxidation-reduction reaction known as a thermite reaction. Choices for a reducing agent include one or more of the following: aluminum; magnesium; calcium; titanium; zinc; silicon; or boron, for example, while choices for an oxidizing agent include one or more of the following: boron oxide; silicon oxide; chromium oxide; manganese oxide; iron oxide; copper oxide; or lead oxide, for example. Self-propagating powder mixtures include one or more of the following: Al—Ni (a mixture of Al powder and Ni powder); Ti—Si (a mixture of Ti powder and Si powder); Ti—B (a mixture of Ti powder and B powder); Zr—Si (a mixture of Zr powder and Si powder), Zr—B (a mixture of Zr powder and B powder); Ti—Al (a mixture of Ti powder and Al powder); Ni—Mg (a mixture of Ni powder and Mg powder); or Mg—Bi (a mixture of Mg powder and Bi powder).

Use of thermite and self-propagating powder mixtures is advantageous as the compositions are stable at wellbore temperatures but produce an extremely intense yet non-explosive exothermic reaction following activation. The activation can be achieved by exposing the swellable composition including the activation material to a selected form of energy. The selected form of energy includes electric current; electromagnetic radiation, including infrared radiation, ultraviolet radiation, gamma ray radiation, and microwave radiation; or heat. The generated energy is absorbed by the condensed expandable graphite and expands the compositions/articles containing the condensed expandable graphite. Meanwhile, the energy is localized therefore any potentially degradation to other parts of the tool is minimized.

The amount of the activation material is not particularly limited and is generally in an amount sufficient to generate enough energy to expand the condensed expandable graphite when the activation material is exposed to the selected form of energy. In an embodiment, the activation material is present in an amount of about 0.5 wt. % to about 20 wt. % or about 1 wt. % to about 15 wt. % based on the total weight of the composition.

The swellable composition can be made by combining the condensed expandable graphite material with the matrix material and optional components, if present. The combining includes drying blending; melt blending; or a combination thereof. In a dry blending process the matrix material is blended with condensed expandable graphite via any suitable methods known in the art. Examples of suitable methods include ball mixing, acoustic mixing, ribbon blending, vertical screw mixing, and V-blending.

In a melt blending process, the matrix material is brought to a temperature above its meting point but below its decomposition temperature and mixed with the condensed expandable graphite. The mixing can be carried out in any suitable mixing device including, for example, in the barrel or an extruder, a Brabender mixture or other compounding equipment.

Alternatively, the swellable composition can be made by polymerizing monomer(s) or oligomer(s) in the presence of condensed expandable graphite or blending the condensed expandable graphite into a curable resinous composition which is subsequently cured in the presence of condensed expandable graphite.

The condensed expandable graphite can be prepared by compressing expandable graphite having a tapped density of about 0.005 to about 1 $g/cm^3$ to provide a condensed expandable graphite bulk material; and breaking the condensed expandable graphite bulk material into condensed expandable graphite particles, wherein the condensed expandable graphite particles have a tapped density of about 0.1 to 6 $g/cm^3$, 0.1 to 4 $g/cm^3$, or 0.1 to 3 $g/cm^3$ or 0.1 to 2 $g/cm^3$. In the instance where a binder is present in the condensed expandable graphite, the compressing includes compressing a mixture of expandable graphite particles having a tapped density of about 0.005 to about 1 $g/cm^3$ and a binder to provide a condensed expandable graphite bulk material; and breaking the condensed expandable graphite bulk material into condensed expandable graphite particles having a tapped density of about 1 to about 5 $g/cm^3$.

Compressing can be conducted at room temperature or at an elevated temperature. In an embodiment the expandable graphite having a tapped density of 0.005 to 1 $g/cm^3$ or a combination of such expandable graphite and a binder is compressed at a temperature of about 20° C. to about 200° C. The pressure to form the condensed expandable graphite bulk material can be about 500 psi to about 10 ksi. The reduction ratio at this stage, i.e., the volume of the condensed expandable graphite bulk material relative to the volume of the expandable graphite having a tapped density of 0.005 to 1 $g/cm^3$ or a combination of such expandable graphite with a binder, is about 10% to about 80% or about 20% to about 50%.

The swellable compositions are useful for preparing articles for a wide variety of applications including but are not limited to electronics, atomic energy, hot metal processing, coatings, aerospace, automotive, oil and gas, and marine applications. The swellable compositions may be used to form all or a portion of an article. Accordingly, articles comprising the swellable compositions are provided.

The articles can be a downhole element. Illustrative articles include seals, high pressure beaded frac screen plugs, screen basepipe plugs, coatings for balls and seats, compression packing elements, expandable packing elements, O-rings, bonded seals, bullet seals, sub-surface safety valve seals, sub-surface safety valve flapper seal, dynamic seals, V-rings, back up rings, drill bit seals, liner port plugs, atmospheric discs, atmospheric chamber discs, debris barriers, drill in stim liner plugs, inflow control device plugs, flappers, seats, ball seats, direct connect disks, drill-in linear disks, gas lift valve plug, fluid loss control flappers, electric submersible pump seals, shear out plugs, flapper valves, gaslift valves, and sleeves.

The articles can be made from the swellable compositions by shaping, or machining, or a combination thereof. Shaping includes molding, extruding, casting, and laminating. Machining includes cutting, sawing, ablating, milling, facing, lathing, boring, and the like using, for example, a miller, saw, lathe, router, electric discharge machine, and the like.

The articles containing the swellable composition can be used in sealing and packing applications. In an embodiment, a method of deploying an article comprises: positioning an article at a predetermined location; wherein the article comprises a swellable composition as disclosed herein, and wherein the composition has a first shape; and activating the condensed expandable graphite to cause the swellable composition to attain a second shape different from the first shape. The method can further comprise isolating or completing a wellbore by deploying the article in the wellbore.

Activating the condensed expandable graphite includes exposing the swellable composition to a microwave energy or heating the swellable composition. Advantageously, the condensed expandable graphite is activated by application of microwave energy. Microwave energy has a wavelength of about 1 mm to about 1 meter. The expansion occurs rapidly. For example, exposing the condensed expandable graphite to microwave energy within a few minutes can trigger the decomposition of the intercallant and cause the graphite to expand to many times its original volume. One advantage of using microwave energy is that it can produce a high rate of heating. Once the microwave irradiation is generated, high temperatures can be reached within seconds and the expansion can start almost instantaneously. Microwave irradiation can be switched off once the graphite is expanded. In addition, microwave irradiation can focus on the swellable composition only thus minimizing the risk of degradation of the tool due to the high temperatures generated by the microwave irradiation.

In an embodiment, the microwave energy is generated through a microwave source disposed in the vicinity of the swellable composition. The microwave source can be operated to vary the level of microwave energy. Alternatively, the microwave energy is generated at another location and directed to the swellable composition through a series of wave guides. For example, the microwave energy can be generated on the earth's surface and directed underground to the swellable composition.

Advantageously, the materials of a device containing the swellable composition, particularly for the portion where the swellable composition is seated, are selected in such a way that they allow microwave to pass through without absorbing or reflecting any significant amount of microwave energy. In an embodiment, greater than about 70%, greater than about 80%, greater than about 90%, or greater than about 95% of the generated microwave energy reaches the swellable composition. Such materials include high toughness ceramics such as alumina, zirconia, silicon carbide, silicon nitride, as well as composites based on these ceramic materials such as fiber enhanced ceramic composites.

The condensed expandable graphite can also be activated by a selected form of energy for the embodiments where the swellable compositions contain an activation material. The selected form of energy includes electric current; electromagnetic radiation, including infrared radiation, ultraviolet radiation, gamma ray radiation, and microwave radiation; or heat.

The downhole articles can be used to isolating or completing a wellbore. The method comprises deploying an apparatus comprising one or more of the downhole articles in a wellbore. For example, the article can be of a type suited for filling an annulus within a borehole in a location surrounding one or more production tubulars. As used herein, the term "production tubulars" is defined to include, for example, any kind of tubular that is used in completing a well, such as, but not limited to, production tubing, production casing, intermediate casings, and devices through which hydrocarbons flow to the surface. Examples of such article include, in non-limiting embodiments, annular isolators used to block off non-targeted production or water zones, and the like.

In addition to forming a swellable composition with a matrix material, the condensed expandable graphite can also be used to form a seal arrangement. In an embodiment, a seal arrangement comprises: a swellable member and a sealing member disposed on a surface of the swellable member. The sealing member comprises one or more of the matrix material disclosed herein while the swellable member comprises condensed expandable graphite. Optionally, the swellable member further comprises a binder and/or an activation material as disclosed herein. The seal arrangement can further comprise an extrusion prevention member adjacent the sealing member. Exemplary extrusion prevention member includes a back-up ring. The seal arrangement can further include an annular body such as a production tubing. The swellable member can be disposed on a surface of the annular body.

A method of deploying the seal arrangement comprises: positioning the seal arrangement at a predetermined location; the swellable member having a first shape; and activating the swellable member to cause the swellable member to attain a second shape different from the first shape. The activating comprises at least one of the following: exposing the swellable member to a microwave energy; or heating the swellable member using the methods disclosed herein. When the swellable member contains an activation material disclosed herein, the activation comprises exposing the swellable member to a selected form of energy. The method of deploying the seal arrangement can further comprise deploying the seal arrangement in a wellbore to isolate or complete the wellbore.

Figure 4:
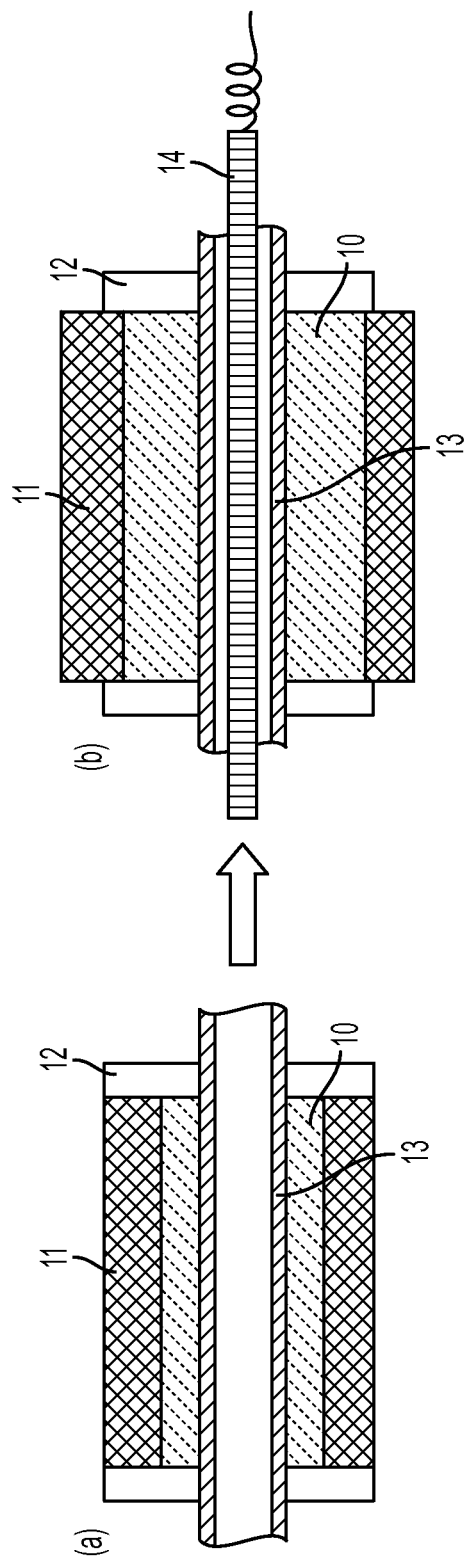
FIG. 4 illustrates a process to set up a packer according to an embodiment of the disclosure where

An exemplary method of deploying a seal arrangement in a wellbore is illustrated in FIGS. 4(a) and 4(b). As shown in FIG. 4(a), a seal arrangement includes a swellable member 10, a sealing member 11, and an extrusion prevention member 12. The seal arrangement is seated against an outer diameter of a production tube 13. In FIG. 4(b), a microwave generator 14 is positioned in the tube 13 near the swellable member 10. The microwave generator 14 generates microwave energy directed to swellable member 10 causing the condensed expandable graphite in swellable member 10 to expand thus filling the space between the outer diameter of the tube 13 and the casing (not shown).

All ranges disclosed herein are inclusive of the endpoints, and the endpoints are independently combinable with each other. The suffix "(s)" as used herein is intended to include both the singular and the plural of the term that it modifies, thereby including at least one of that term (e.g., the colorant(s) includes at least one colorants). "Or" means "and/or." "Optional" or "optionally" means that the subsequently described event or circumstance can or cannot occur, and that the description includes instances where the event occurs and instances where it does not. As used herein, "combination" is inclusive of blends, mixtures, alloys, reaction products, and the like. "A combination thereof" means "a combination comprising one or more of the listed items and optionally a like item not listed." All references are incorporated herein by reference. Unless specified otherwise, all densities are measured at 23° C.

The use of the terms "a" and "an" and "the" and similar referents in the context of describing the invention (especially in the context of the following claims) are to be construed to cover both the singular and the plural, unless otherwise indicated herein or clearly contradicted by context. Further, it should further be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

While typical embodiments have been set forth for the purpose of illustration, the foregoing descriptions should not be deemed to be a limitation on the scope herein. Accordingly, various modifications, adaptations, and alternatives can occur to one skilled in the art without departing from the spirit and scope herein.

What is claimed is:

1. A swellable composition comprising:
a matrix material; and
a condensed expandable graphite material disposed in the matrix material;
wherein the condensed expandable graphite material has a bulk density of about 1 to about 8 g/cm$^3$ and comprises expandable graphite.

2. The composition of claim 1, wherein the matrix material is one or more of the following: an ethylene-propylene-diene monomer rubber; a butadiene rubber; a styrene-butadiene rubber; a natural rubber; an acrylonitrile butadiene rubber; a styrene-butadiene-acrylonitrile resin; a butadiene-nitrile rubber; a polyisoprene rubber; an acrylate-butadiene rubber; a polychloroprene rubber; an acrylate-isoprene rubber; an ethylene-vinyl acetate rubber; a polypropylene oxide rubber; a polypropylene sulfide rubber; a fluoroelastomer; or a thermoplastic polyurethane rubber.

3. The composition of claim 1, wherein the condensed expandable graphite material further comprises a binder containing one or more of the following: $SiO_2$; Si; B; $B_2O_3$; a metal; or a metal alloy; wherein the metal is one or more of the following: aluminum; copper; titanium; nickel; tungsten; chromium; iron; manganese; zirconium; hafnium; vanadium; niobium; molybdenum; tin; bismuth; antimony; lead; cadmium; or selenium.

4. The composition of claim 3, wherein the condensed expandable graphite material comprises about 20 to about 95 wt. % of the expandable graphite and about 5 to about 80 wt. % of the binder.

5. The composition of claim 1, wherein the condensed expandable graphite material comprises particles having an average particle size of about 10 microns to about 5 centimeters.

6. The composition of claim 1, further comprising an activation material containing one or more of the following: a thermite; Al—Ni; Ti—Si; Ti—B; Zr—Si, Zr—B; Ti—Al; Ni—Mg; or Mg—Bi.

7. The composition of claim 6, wherein the thermite comprises a reducing agent and an oxidizing agent, wherein the reducing agent comprises one or more of the following: aluminum; magnesium; calcium; titanium; zinc; silicon; or boron; and the oxidizing agent comprises one or more of the following: boron oxide; silicon oxide; chromium oxide; manganese oxide; iron oxide; copper oxide; or lead oxide.

8. An article comprising the composition of claim 1.

9. The article of claim 8, wherein the article is a swellable article.

10. The article of claim 8, wherein the article is a seal; a high pressure beaded frac screen plug; a screen basepipe plug; a coating for balls and seats; a gasket; a compression packing element; an expandable packing element; an O-ring; a bonded seal; a bullet seal; a sub-surface safety valve seal; a sub-surface safety valve flapper seal; a dynamic seal; a V-ring; a back-up ring; a drill bit seal; a liner port plug; an atmospheric disc; an atmospheric chamber discs; a debris barrier; a drill in stim liner plug; an inflow control device plug; a flapper; a seat; a ball seat; a direct connect disk; a drill-in linear disk; a gas lift valve plug; a fluid loss control flapper; an electric submersible pump seal; a shear out plug; a flapper valve; a gaslift valve; or a sleeve.

11. A seal arrangement comprising:
a swellable member and a sealing member disposed on a surface of the swellable member;
wherein the swellable member comprises a condensed expandable graphite material;
and wherein the condensed expandable graphite material has a bulk density of about 1 to about 8 $g/cm^3$ and comprises expandable graphite.

12. The seal arrangement of claim 11, wherein the sealing member comprises one or more of the following: an ethylene-propylene-diene monomer rubber; a butadiene rubber; a styrene-butadiene rubber; a natural rubber; an acrylonitrile butadiene rubber; a styrene-butadiene-acrylonitrile resin; a butadiene-nitrile rubber; a polyisoprene rubber; an acrylate-butadiene rubber; a polychloroprene rubber; an acrylate-isoprene rubber; an ethylene-vinyl acetate rubber; a polypropylene oxide rubber; a polypropylene sulfide rubber; a fluoroelastomer; or a thermoplastic polyurethane rubber.

13. The seal arrangement of claim 11, wherein the condensed expandable graphite material further comprises a binder containing one or more of the following: $SiO_2$; Si; B; $B_2O_3$; a metal; or a metal alloy; wherein the metal is one or more of the following: aluminum; copper; titanium; nickel; tungsten; chromium; iron; manganese; zirconium; hafnium; vanadium; niobium; molybdenum; tin; bismuth; antimony; lead; cadmium; or selenium.

14. The seal arrangement of claim 13, wherein the condensed expandable graphite material comprises about 20 to about 95 wt. % of the expandable graphite and about 5 to about 80 wt. % of the binder based on the total weight of the condensed expandable graphite material.

15. The seal arrangement of claim 14, wherein the condensed expandable graphite material comprises about 20 to about 50 wt. % of the binder based on the total weight of the condensed expandable graphite material.

16. The seal arrangement of claim 13, wherein the binder comprises copper, nickel, chromium, iron, titanium, an alloy of copper, an alloy of nickel, an alloy of chromium, an alloy of iron, an alloy of titanium, or a combination comprising at least one of the foregoing metal or metal alloy.

17. The seal arrangement of claim 11, wherein the swellable member further comprises an activation material containing one or more of the following: a thermite; Al—Ni; Ti—Si; Ti—B; Zr—Si, Zr—B; Ti—Al; Ni—Mg; or Mg—Bi.

18. The seal arrangement of claim 17, wherein the thermite comprises a reducing agent and an oxidizing agent, wherein the reducing agent comprises one or more of the following: aluminum; magnesium; calcium; titanium; zinc; silicon; or boron; and the oxidizing agent comprises one or more of the following: boron oxide; silicon oxide; chromium oxide; manganese oxide; iron oxide; copper oxide; or lead oxide.

19. The seal arrangement of claim 11, further comprising an extrusion prevention member adjacent the sealing member.

20. The seal arrangement of claim 19, wherein the extrusion prevention member is a back-up ring.

21. The seal arrangement of claim 11, wherein the seal arrangement further comprises an annular body; and the swellable member is disposed on a surface of the annular body.

22. The seal arrangement of claim 21, wherein the annular body is a production tubing.

23. The seal arrangement of claim 11, wherein the condensed expandable graphite material comprises particles having an average particle size of about 10 microns to about 5 centimeters.

24. A method of deploying a seal arrangement, the method comprising:
positioning a seal arrangement at a predetermined location; the swellable member having a first shape; and
activating the swellable member to cause the swellable member to attain a second shape different from the first shape,
the seal arrangement comprising: a swellable member and a sealing member disposed on a surface of the swellable member; wherein the swellable member comprises a condensed expandable graphite material, and wherein the condensed expandable graphite material has a bulk density of about 1 to about 8 $g/cm^3$ and comprises expandable graphite.

25. The method of claim 24, wherein the activating comprises exposing the composition to one or more of the following: a microwave energy; electric current; an electromagnetic radiation; or heat.

26. The method of claim 24 comprising deploying the seal arrangement in a wellbore to isolate or complete the wellbore.

27. The method of claim 24 further comprising disposing a microwave source in the vicinity of the seal arrangement, wherein the microwave source is effective to generate a microwave energy to heat and expand the swellable member.

28. The method of claim 24, wherein the seal arrangement further comprises an annular body; and the swellable member is disposed on a surface of the annular body.

29. The method of claim 28, further comprising disposing a microwave source in the annular body.

30. The method of claim 24, wherein the sealing member comprises one or more of the following: an ethylene-propylene-diene monomer rubber; a butadiene rubber; a styrene-butadiene rubber; a natural rubber; an acrylonitrile butadiene rubber; a styrene-butadiene-acrylonitrile resin; a butadiene-nitrile rubber; a polyisoprene rubber; an acrylate-butadiene rubber; a polychloroprene rubber; an acrylate-isoprene rubber; an ethylene-vinyl acetate rubber; a polypropylene oxide rubber; a polypropylene sulfide rubber; a fluoroelastomer; or a thermoplastic polyurethane rubber.

31. The method of claim 24, wherein the condensed expandable graphite material further comprises a binder containing one or more of the following: $SiO_2$; Si; B; $B_2O_3$; a metal; or a metal alloy; wherein the metal is one or more of the following: aluminum; copper; titanium; nickel; tungsten; chromium; iron; manganese; zirconium; hafnium; vanadium; niobium; molybdenum; tin; bismuth; antimony; lead; cadmium; or selenium.

32. The method of claim 24, wherein the swellable member further comprises an activation material containing one or more of the following: a thermite; Al—Ni; Ti—Si; Ti—B; Zr—Si, Zr—B; Ti—Al; Ni—Mg; or Mg—Bi.

33. The method of claim 24, further comprising an extrusion prevention member adjacent the sealing member.

34. The method of claim 24, wherein the extrusion prevention member is a back-up ring.

35. The method of claim 24, wherein the seal arrangement further comprises an annular body; and the swellable member is disposed on a surface of the annular body.

* * * * *